United States Patent
Meade et al.

(10) Patent No.: US 12,019,269 B2
(45) Date of Patent: *Jun. 25, 2024

(54) MULTI-CHIP PACKAGING OF SILICON PHOTONICS

(71) Applicant: Ayar Labs, Inc., Santa Clara, CA (US)

(72) Inventors: Roy Edward Meade, Lafayette, CA (US); Chong Zhang, San Jose, CA (US); Haiwei Lu, San Jose, CA (US); Chen Li, San Jose, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,485

(22) Filed: Nov. 15, 2022

(65) Prior Publication Data
US 2023/0070458 A1 Mar. 9, 2023

Related U.S. Application Data

(63) Continuation of application No. 17/070,601, filed on Oct. 14, 2020, now Pat. No. 11,500,153.

(60) Provisional application No. 62/915,632, filed on Oct. 15, 2019.

(51) Int. Cl.
*G02B 6/122* (2006.01)
*G02B 6/12* (2006.01)

(52) U.S. Cl.
CPC ........ *G02B 6/1225* (2013.01); *G02B 6/12011* (2013.01); *G02B 2006/1213* (2013.01)

(58) Field of Classification Search
CPC .............. G02B 6/1225; G02B 6/12011; G02B 2006/1213
See application file for complete search history.

(56) References Cited

U.S. PATENT DOCUMENTS 11,500,153 B2 * 11/2022 Meade ................... G02B 6/421
2020/0219865 A1 * 7/2020 Nelson .............. H01L 23/49838

* cited by examiner

*Primary Examiner* — Tina M Wong
(74) *Attorney, Agent, or Firm* — Penilla IP, APC

(57) ABSTRACT

A multi-chip package assembly includes a substrate, a first semiconductor chip attached to the substrate, and a second semiconductor chip attached to the substrate, such that a portion of the second semiconductor chip overhangs an edge of the substrate. A first v-groove array for receiving a plurality of optical fibers is present within the portion of the second semiconductor chip that overhangs the edge of the substrate. An optical fiber assembly including the plurality of optical fibers is positioned and secured within the first v-groove array of the second semiconductor chip. The optical fiber assembly includes a second v-groove array configured to align the plurality of optical fibers to the first v-groove array of the second semiconductor chip. An end of each of the plurality of optical fibers is exposed for optical coupling within an optical fiber connector located at a distal end of the optical fiber assembly.

15 Claims, 12 Drawing Sheets

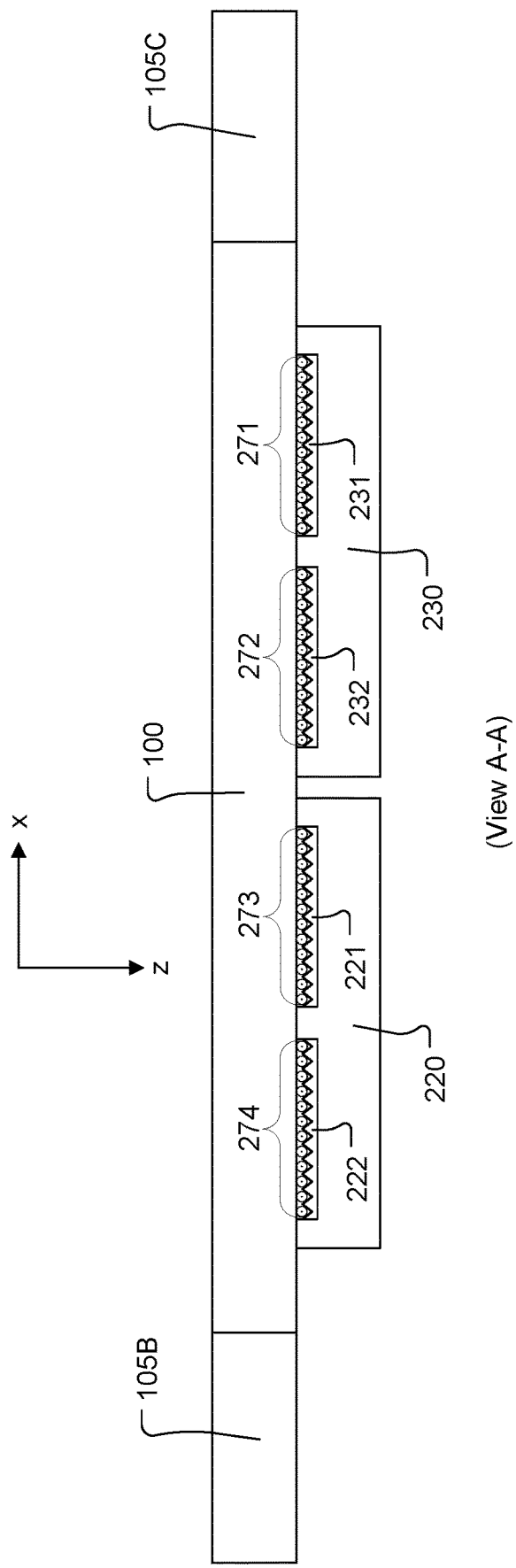

MULTI-CHIP PACKAGING OF SILICON PHOTONICS

CLAIM OF PRIORITY

This application is a continuation application under 35 U.S.C. 120 of prior U.S. Non-Provisional application Ser. No. 17/070,601, filed on Oct. 14, 2020, issued as U.S. Pat. No. 11,500,153, on Nov. 15, 2022, which claims priority under 35 U.S.C. 119(e) to U.S. Provisional Patent Application No. 62/915,632, filed on Oct. 15, 2019. The disclosure of each above-identified patent application is incorporated herein by reference in its entirety for all purposes.

BACKGROUND

In semiconductor device fabrication, integrated circuit packaging is a later stage of fabrication in which one or more integrated circuit die are attached to a supporting package that supports electrical contacts to enable connection of the one or more integrated circuit die to one or more external devices. The electronics industry has developed a multitude of package styles, including wire bonding, flip-chip onto both organic and ceramic substrates, flip-chip onto silicon and glass interposers, package-on-package, and wafer/panel-level fan-out and fan-in, among others. Diversity in package styles in the electronics industry is intended to support different cost and performance requirements. For example, lower power applications (e.g., mobile device applications) often use wafer-level fan-out technology. 2.5D silicon interposers are used for High Performance Computing (HPC) applications. The term "2.5D" refers to a packaging technology in which multiple die are included inside the same package. The term "2.1D" refers to a packaging technology in which a high-density wiring layer formed on the chip side of the substrate acts as an interposer, instead of the using a silicon interposer, such as in the 2.5D approach. The 2.1D packaging technology is potentially lower cost than the 2.5D packaging technology. However, there are technical challenges with both the 2.1D and 2.5D packaging technologies, particularly in silicon photonic packaging implementations for use in optical data communication systems. It is within this context that the present invention arises.

SUMMARY

In an example embodiment, a multi-chip package assembly is disclosed. The multi-chip package assembly includes a substrate, and a first semiconductor chip attached to the substrate, and a second semiconductor chip attached to the substrate, such that a portion of the second semiconductor chip overhangs an edge of the substrate. A first v-groove array for receiving a plurality of optical fibers is present within the portion of the second semiconductor chip that overhangs the edge of the substrate. The multi-chip package assembly also includes an optical fiber assembly that includes the plurality of optical fibers positioned and secured within the first v-groove array of the second semiconductor chip. The optical fiber assembly includes a second v-groove array configured to align the plurality of optical fibers to the first v-groove array of the second semiconductor chip. An end of each of the plurality of optical fibers is exposed for optical coupling within an optical fiber connector of the optical fiber assembly. The optical fiber connector is located at a distal end of the optical fiber assembly relative to the second semiconductor chip.

In an example embodiment, a method is disclosed for manufacturing a multi-chip package assembly. The method includes having a substrate. The method also includes attaching a first semiconductor chip to the substrate. The method also includes attaching a second semiconductor chip to the substrate, such that a portion of the second semiconductor chip overhangs an edge of the substrate. A first v-groove array for receiving a plurality of optical fibers is present within the portion of the second semiconductor chip that overhangs the edge of the substrate. The method also includes attaching an optical fiber assembly to the second semiconductor chip by positioning and securing the plurality of optical fibers of the optical fiber assembly within the first v-groove array of the second semiconductor chip. An end of each of the plurality of optical fibers is exposed for optical coupling within an optical fiber connector of the optical fiber assembly. The optical fiber connector is located at a distal end of the optical fiber assembly relative to the second semiconductor chip.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 2B shows a side view of the assembly of FIG. 2A, referenced as View A-A in FIG. 2A, in accordance with some embodiments.

DETAILED DESCRIPTION

Figure 1:
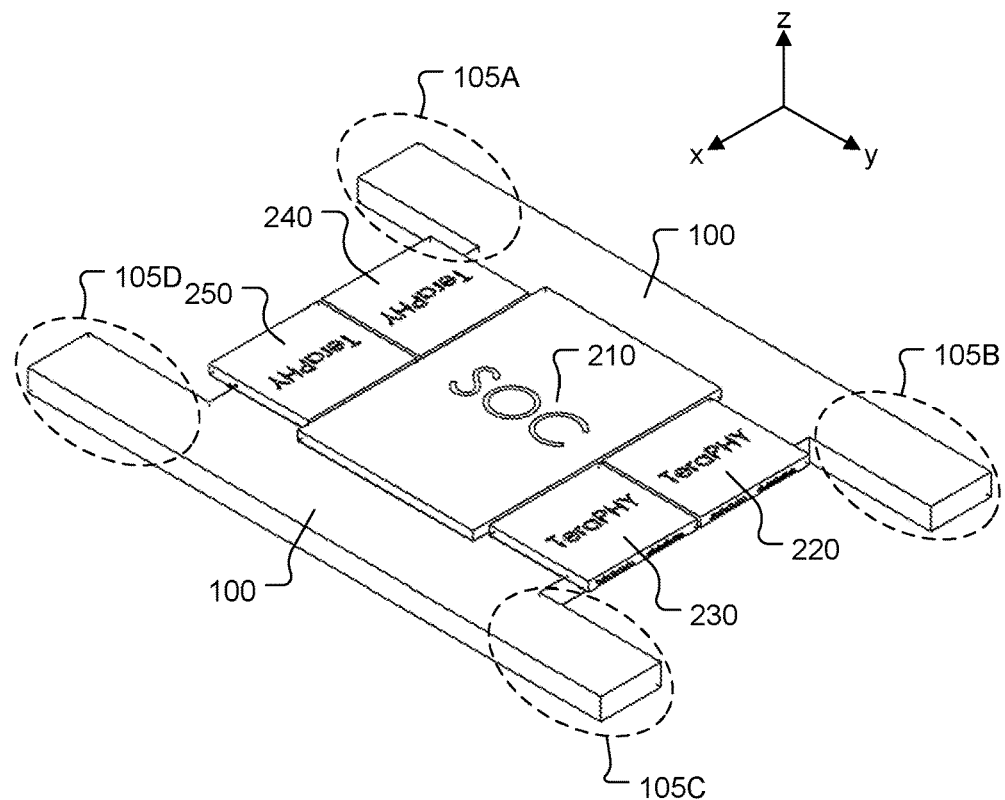
FIG. 1 shows an isometric view of an assembly in which a plurality of semiconductor chips are flip-chip connected to a substrate, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

In various silicon photonic devices used in the silicon photonics industry for optical data communication, one or more optical fiber(s) is/are coupled to a semiconductor chip so that light (continuous wave (CW) light and/or modulated light) can be transmitted from the one or more optical fiber(s) into the semiconductor chip and/or transmitted from the semiconductor chip into the one or more optical fiber(s). For ease of description the term semiconductor chip as used herein refers to both a semiconductor chip and a semiconductor die. Also, in various embodiments the semiconductor chip referred to herein includes electrical devices, optical devices, electro-optical devices, and/or thermo-optical devices, and corresponding electrical and optical circuitry. The semiconductor chip referred to herein corresponds to any photonic-equipped chip (or die) to which one or more optical fiber(s) is/are connected to provide for transmission of light into and/or out of the semiconductor chip. The coupling of an optical fiber to a semiconductor chip is referred to as fiber-to-chip coupling.

The term "light" as used herein refers to electromagnetic radiation within a portion of the electromagnetic spectrum that is usable by optical data communication systems. In some embodiments, the portion of the electromagnetic spectrum includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum.

In some semiconductor chip packaging embodiments, in-package optical interconnect relies on 2.5D or 2.1D interposer-type packaging technology. In some embodiments, the semiconductor chip includes integrated v-grooves configured to facilitate attachment of optical fibers. Also, in some semiconductor chip packaging embodiments, either a 3D packaging approach, e.g., die stacking, or a wire-bonding approach is utilized. However, a silicon photonics package assembly approach utilizing either a 2D packaging approach or 2.5D packaging approach would be economically beneficial. Embodiments are disclosed herein for multi-chip packaging of silicon photonic devices. In particular, various embodiments are disclosed herein for co-packaging of a plurality of silicon photonic semiconductor chips with a system-on-chip (SOC) semiconductor chip.

FIG. 1 shows an isometric view of an assembly in which a plurality of semiconductor chips 210, 220, 230, 240, 250 are flip-chip connected to a substrate 100, in accordance with some embodiments. In the example of FIG. 1, the substrate 100 includes extension sections 105A, 105B, 105C, 105D that extend outward in the horizontal plane (in a direction parallel to the x-y plane) from the four corners of the substrate 100. However, in some embodiments, the substrate 100 has a substantially rectangular-shaped horizontal cross-section (parallel to the x-y plane) and does not include the extension sections 105A, 105B, 105C, 105D. In various embodiments, the horizontal cross-section of the substrate 100 can have a substantially rectangular shape, a substantially square shape, or a substantially polygonal shape, among other shapes. In some embodiments, the substrate 100 is an organic substrate. In some embodiments, the substrate 100 includes an organic substrate combined with a silicon interposer. In various embodiments, the substrate 100 is essentially any type of substrate used in the packaging assembly of semiconductor chips, such as a composite substrate, a glass substrate, a ceramic substrate, among other substrate types.

FIG. 1 shows the semiconductor chip 210 connected to the substrate 100. In some embodiments, the semiconductor chip 210 is flip-chip connected to the substrate 100. In some embodiments, the semiconductor chip 210 is an SOC semiconductor chip. It should be understood, however, that in some embodiments the semiconductor chip 210 is not an SOC semiconductor chip. Therefore, in various embodiments, the semiconductor chip 210 can be essentially any type of semiconductor chip. For example, in some embodiments, the semiconductor chip 210 is a central processing unit (CPU) chip, a graphics processing unit (GPU) chip, a field programmable gate array (FPGA) chip, a graphics processor chip, a memory chip (such as a dynamic random access memory (DRAM), or NAND flash memory, or other type of memory), a network processor chip, a switch chip, or an artificial intelligence chip, among essentially any other type of semiconductor chip. In some embodiments, the semiconductor chip 210 does not overhang any edge of the substrate 100.

In some embodiments, each of the semiconductor chips 220, 230, 240, 250 is a silicon photonics chip that includes optical devices and/or electro-optical devices and/or thermo-optical devices. In some embodiments, one or more of the semiconductor chips 220, 230, 240, 250 is a TeraPHY™ semiconductor chip as provided by Ayar Labs, Inc. of Santa Clara, California, as described in U.S. patent application Ser. No. 16/510,821, which is incorporated herein by reference in its entirety. However, it should be understood that implementation of each of the semiconductor chips 220, 230, 240, 250 as the TeraPHY™ chip is provided by way of example. In various embodiments, each of the semiconductor chips 220, 230, 240, 250 is essentially any type of photonics chip, whether it be the TeraPHY™ chip or another type of photonics chip. In some embodiments, each of the semiconductor chips 220, 230, 240, 250 is configured for optical connection to an optical fiber array and/or to a photonics optical waveguide. Also, it should be understood that in some embodiments, one or more of the semiconductor chips 220, 230, 240, 250 is/are connected to the substrate 100. For example, in some embodiments, one of the semiconductor chips 220, 230, 240, 250 is connected to the substrate 100. In some embodiments, two of the semiconductor chips 220, 230, 240, 250 are connected to the substrate 100. In some embodiments, three of the semiconductor chips 220, 230, 240, 250 are connected to the substrate 100. In some embodiments, all four of the semiconductor chips 220, 230, 240, 250 are connected to the substrate 100. Also, in some embodiments, the substrate 100 is sized to accommodate connection of more than the four semiconductor chips 220, 230, 240, 250 to the substrate 100.

In some embodiments, the semiconductor chips 210, 220, 230, 240, 250 are flip-chip connected to the substrate 100 using a number of C4 (controlled collapse chip connection) solder bumps. In some embodiments, the semiconductor chips 210, 220, 230, 240, 250 are flip-chip connected to the substrate 100 using a number of copper pillars. In some embodiments, the semiconductor chips 210, 220, 230, 240, 250 are flip-chip connected to the substrate 100 using a combination of C4 solder bumps, copper pillars, and/or any other chip-to-package electrical connection technique that is standard within the semiconductor fabrication industry. In some embodiments, a dielectric underfill material (e.g., epoxy underfill material) is disposed between one or more of the semiconductor chips 210, 220, 230, 240, 250 and the substrate 100. However, in some embodiments, the dielectric underfill material is not disposed between some of the semiconductor chips 210, 220, 230, 240, 250 and the substrate 100. In some embodiments, the dielectric underfill material is not disposed between any of the semiconductor chips 210, 220, 230, 240, 250 and the substrate 100.

Figure 2A:
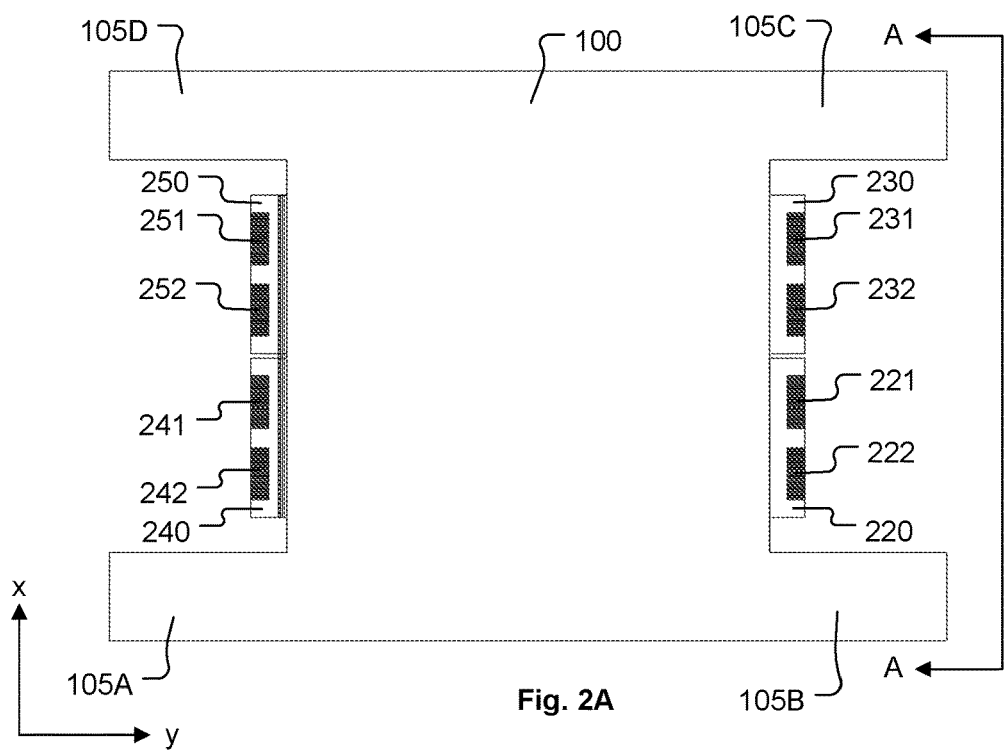
FIG. 2A shows a bottom view of the assembly of FIG. 1, in accordance with some embodiments.

FIG. 2A shows a bottom view of the assembly of FIG. 1, in accordance with some embodiments. Each of the semiconductor chips 220, 230, 240, 250 is shaped, sized, and positioned to overhang a corresponding edge of the substrate 100 in a cantilevered manner. In some embodiments, the semiconductor chip 220 includes a first v-groove array 221 and a second v-groove array 222. In some embodiments, the semiconductor chip 230 includes a first v-groove array 231 and a second v-groove array 232. In some embodiments, the semiconductor chip 240 includes a first v-groove array 241 and a second v-groove array 242. In some embodiments, the semiconductor chip 250 includes a first v-groove array 251 and a second v-groove array 252. Each of the v-groove arrays 221, 222, 231, 232, 241, 242, 251, 252 includes a number of v-grooves, with each v-groove configured to receive an optical fiber, such that a core of the optical fiber is optically aligned with an optical waveguide in the corresponding semiconductor chip 220, 230, 240, 250 in which the v-groove array 221, 222, 231, 232, 241, 242, 251, 252 is formed. In some embodiments, the v-grooves of the v-groove array 221, 222, 231, 232, 241, 242, 251, 252 are oriented parallel to each other to facilitate connection of an optical fiber ribbon to the corresponding semiconductor chip 220, 230, 240, 250 in which the v-groove array 221, 222, 231, 232, 241, 242, 251, 252 is formed. In some embodiments, each of the semiconductor chips 220, 230, 240, 250 is shaped, sized, and positioned to overhang the substrate 100 in the cantilevered manner by an extent that provides for exposure of the v-groove arrays 221, 222, 231, 232, 241, 242, 251, 252 to facilitate connection of optical fibers with the semiconductor chips 220, 230, 240, 250.

In some embodiments, each of the first v-groove array 221 and the second v-groove array 222 of semiconductor chip 220 has a same number of v-grooves and substantially equal size. In some embodiments, each of the first v-groove array 221 and the second v-groove array 222 of the semiconductor chip 220 has 12 v-grooves. However, it should be understood that in various embodiments, each of the first v-groove array 221 and the second v-groove array 222 of the semiconductor chip 220 can have essentially any number of v-grooves, from one v-groove to multiple v-grooves (e.g., 1, 2, 4, 8, 12, 16, 24, etc., v-grooves). In some embodiments, the first v-groove array 221 has a different number of v-grooves than the second v-groove array 222. Also, in some embodiments, the semiconductor chip 220 includes one of the first v-groove array 221 and the second v-groove array 222, but not the other. And, in some embodiments, the semiconductor chip 220 includes both of the first v-groove array 221 and the second v-groove array 222, along with one or more additional v-grooves and/or v-groove arrays.

In some embodiments, each of the first v-groove array 231 and the second v-groove array 232 of semiconductor chip 230 has a same number of v-grooves and substantially equal size. In some embodiments, each of the first v-groove array 231 and the second v-groove array 232 of the semiconductor chip 230 has 12 v-grooves. However, it should be understood that in various embodiments, each of the first v-groove array 231 and the second v-groove array 232 of the semiconductor chip 230 can have essentially any number of v-grooves, from one v-groove to multiple v-grooves (e.g., 1, 2, 4, 8, 12, 16, 24, etc., v-grooves). In some embodiments, the first v-groove array 231 has a different number of v-grooves than the second v-groove array 232. Also, in some embodiments, the semiconductor chip 230 includes one of the first v-groove array 231 and the second v-groove array 232, but not the other. And, in some embodiments, the semiconductor chip 230 includes both of the first v-groove array 231 and the second v-groove array 232, along with one or more additional v-grooves and/or v-groove arrays.

In some embodiments, each of the first v-groove array 241 and the second v-groove array 242 of semiconductor chip 240 has a same number of v-grooves and substantially equal size. In some embodiments, each of the first v-groove array 241 and the second v-groove array 242 of the semiconductor chip 240 has 12 v-grooves. However, it should be understood that in various embodiments, each of the first v-groove array 241 and the second v-groove array 242 of the semiconductor chip 240 can have essentially any number of v-grooves, from one v-groove to multiple v-grooves (e.g., 1, 2, 4, 8, 12, 16, 24, etc., v-grooves). In some embodiments, the first v-groove array 241 has a different number of v-grooves than the second v-groove array 242. Also, in some embodiments, the semiconductor chip 240 includes one of the first v-groove array 241 and the second v-groove array 242, but not the other. And, in some embodiments, the semiconductor chip 240 includes both of the first v-groove array 241 and the second v-groove array 242, along with one or more additional v-grooves and/or v-groove arrays.

In some embodiments, each of the first v-groove array 251 and the second v-groove array 252 of semiconductor chip 250 has a same number of v-grooves and substantially equal size. In some embodiments, each of the first v-groove array 251 and the second v-groove array 252 of the semiconductor chip 250 has 12 v-grooves. However, it should be understood that in various embodiments, each of the first v-groove array 251 and the second v-groove array 252 of the semiconductor chip 250 can have essentially any number of v-grooves, from one v-groove to multiple v-grooves (e.g., 1, 2, 4, 8, 12, 16, 24, etc., v-grooves). In some embodiments, the first v-groove array 251 has a different number of v-grooves than the second v-groove array 252. Also, in some embodiments, the semiconductor chip 250 includes one of the first v-groove array 251 and the second v-groove array 252, but not the other. And, in some embodiments, the semiconductor chip 250 includes both of the first v-groove array 251 and the second v-groove array 252, along with one or more additional v-grooves and/or v-groove arrays.

FIG. 2B shows a side view of the assembly of FIG. 2A, referenced as View A-A in FIG. 2A, in accordance with some embodiments. A set of optical fibers 271 are positioned within the v-groove array 231. A set of optical fibers 272 are positioned within the v-groove array 232. A set of optical fibers 273 are positioned within the v-groove array 221. A set of optical fibers 274 are positioned within the v-groove array 222.

Figure 3:
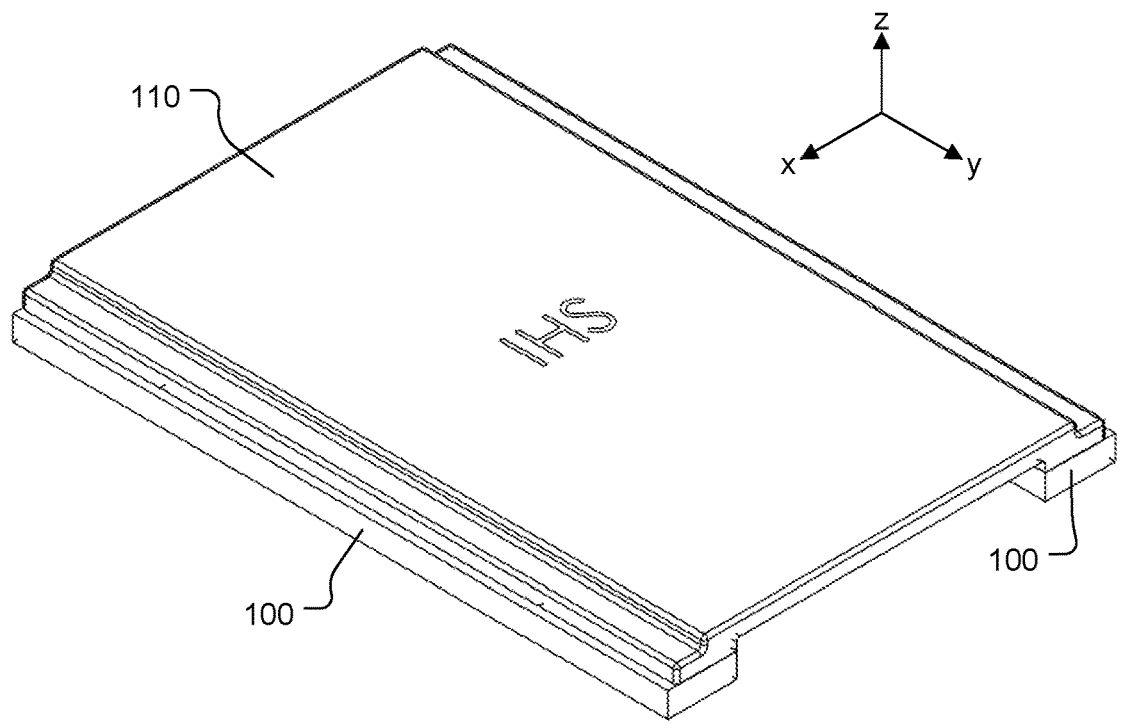
FIG. 3 shows an isometric view of the assembly of FIG. 1 with an Integrated Heat Spreader attached to a top surface of the substrate, in accordance with some embodiments.

FIG. 3 shows an isometric view of the assembly of FIG. 1 with an Integrated Heat Spreader (IHS) 110 attached to a top surface of the substrate 100, in accordance with some embodiments. In some embodiments, the IHS 110 also serves as a lid structure. In some embodiments, a thermal interface material (TIM) is disposed between the IHS 110 and the exposed upper surfaces of the semiconductor chips 210, 220, 230, 240, 250 that are connected to the substrate 100. In various embodiments, the TIM between the IHS 110 and the semiconductor chips/die 210, 220, 230, 240, 250 is one or more of an epoxy, a polymer thermal interface material (PTIM), an elastomer, or another type of TIM. Also, in some embodiments, the IHS 110 functions as a structural support member to provide structural reinforcement to the substrate 100 and/or to the semiconductor chips 220, 230, 240, 250 that are positioned to overhang the substrate 100 in the cantilevered manner. In some embodiments, the IHS 110 is formed of one or more material(s) having high thermal conductivity, such as aluminum, copper, tungsten, molybdenum, copper-tungsten alloy, copper-molybdenum alloy, aluminum-nitride, sintered aluminum-silicon carbide, magnesium-silicon carbide, sumicrystal, chemical vapor deposited diamond, copper-diamond, silver-diamond, and/or other similar heat spreader material.

Figure 4A:
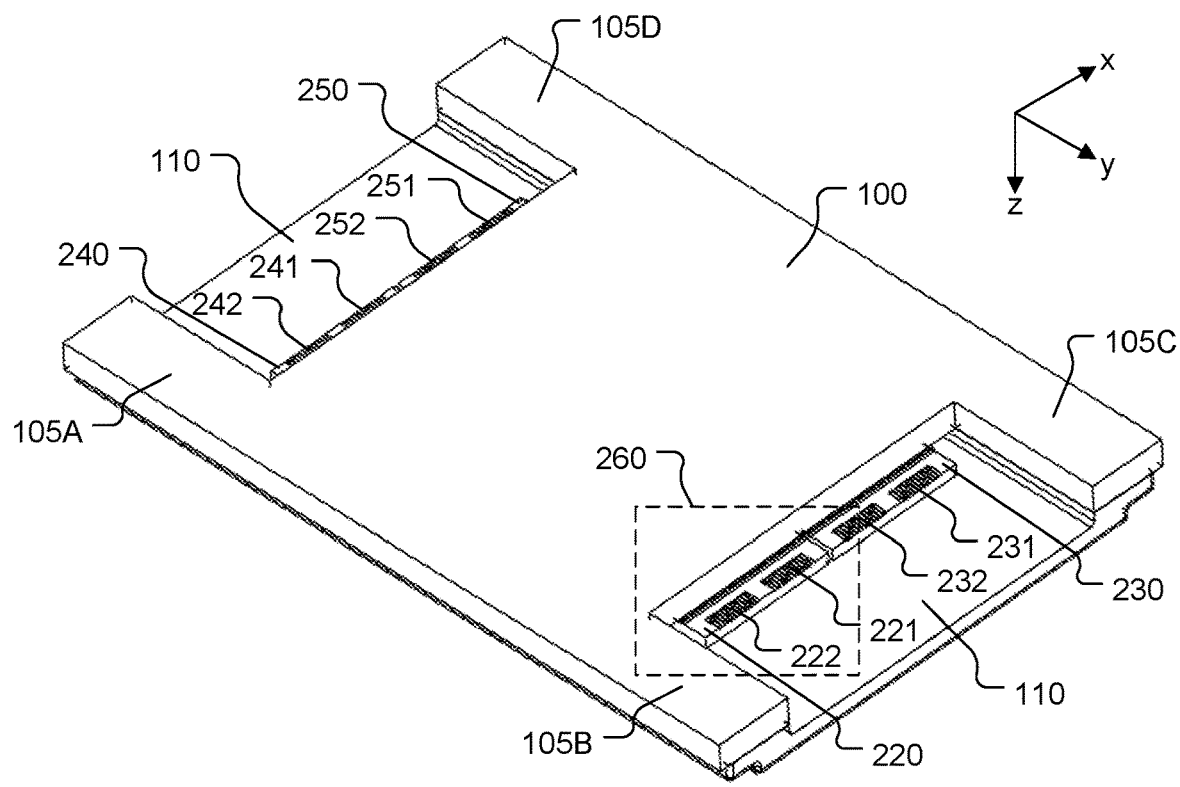
FIG. 4A shows an isometric view of the bottom of the assembly of FIG. 3, in accordance with some embodiments.
Figure 4B:
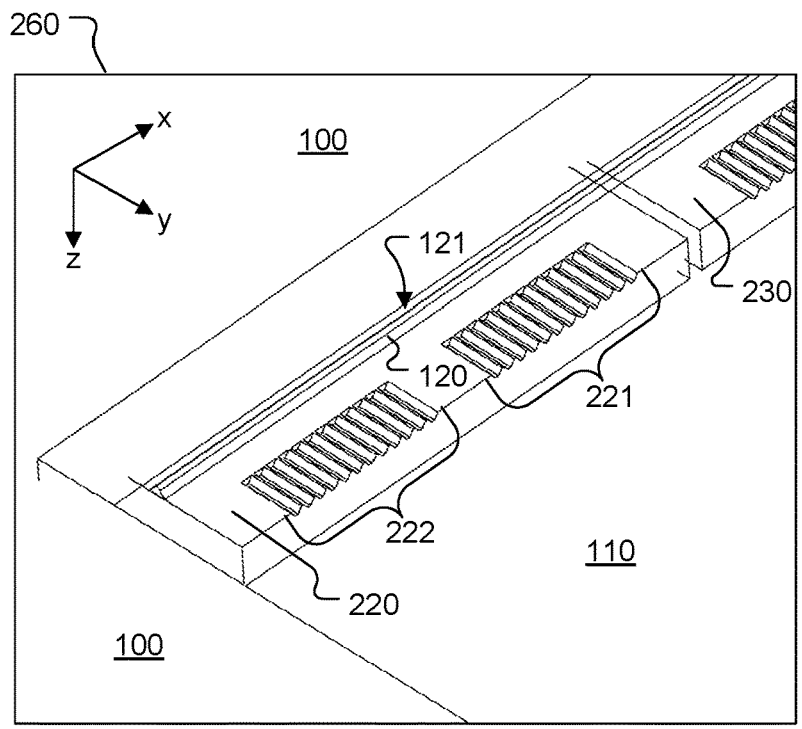
FIG. 4B shows a close-up view of an area as referenced in FIG. 4A, in accordance with some embodiments.

FIG. 4A shows an isometric view of the bottom of the assembly of FIG. 3, in accordance with some embodiments. FIG. 4B shows a close-up view of an area 260 as referenced in FIG. 4A, in accordance with some embodiments. FIG. 4B shows the semiconductor chips 220 and 230. FIG. 4B also shows the first v-groove array 221 and the second v-groove array 222 of the semiconductor chip 220. FIG. 4B also shows the substrate 100 and the IHS 110. FIG. 4B also shows a dam structure 120 formed on the semiconductor chip 220 at a location between the substrate 100 and each of the first v-groove array 221 and the second v-groove array 222. It should be understood that the other semiconductor chips 230, 240, 250 also include a similarly configured dam structure 120. In some embodiments, the dam structure 120 does not physically contact the substrate 100, such that a gap 121 exists between the dam structure 120 and the substrate 100. In some embodiments, the gap 121 between the dam structure 120 and the substrate 100 allows air to escape from the region between the semiconductor chips 210, 220, 230, 240, 250 and the substrate 100 during a capillary underfill (CUF) process in which an underfill material, such as epoxy or other suitable underfill material, is disposed within the open region(s) between the semiconductor chips 210, 220, 230, 240, 250 and the substrate 100. It should be understood that allowing the escape of air from the region between the semiconductor chips 210, 220, 230, 240, 250 and the substrate 100 during the CUF process will reduce the creation of voids within the underfill material.

Also, the dam structure 120 serves to reduce bleed-out of the underfill material during the CUF process. In this manner, the dam structure 120 prevents the underfill material from bleeding-out and fouling the first v-groove array 221 and the second v-groove array 222 of the semiconductor chip 220 during the CUF process. The dam structure 120 separates the underfill material from the v-groove array 221, 222 of the semiconductor chip 220. In some embodiments, the dam structure 120 is configured to extend across and physically contact both the semiconductor chip 220 and the semiconductor chip 230 in a substantially continuous manner. In some embodiments, each of the semiconductor chips 220, 230, 240, 250 has their own dam structure 120 disposed thereon in the same manner as described with regard to the semiconductor chip 220 in FIG. 4B. It should be understood that in various embodiments the CUF process is performed after the dam structures 120 are formed/disposed on the semiconductor chips 220, 230, 240, 250.

Figure 5A:
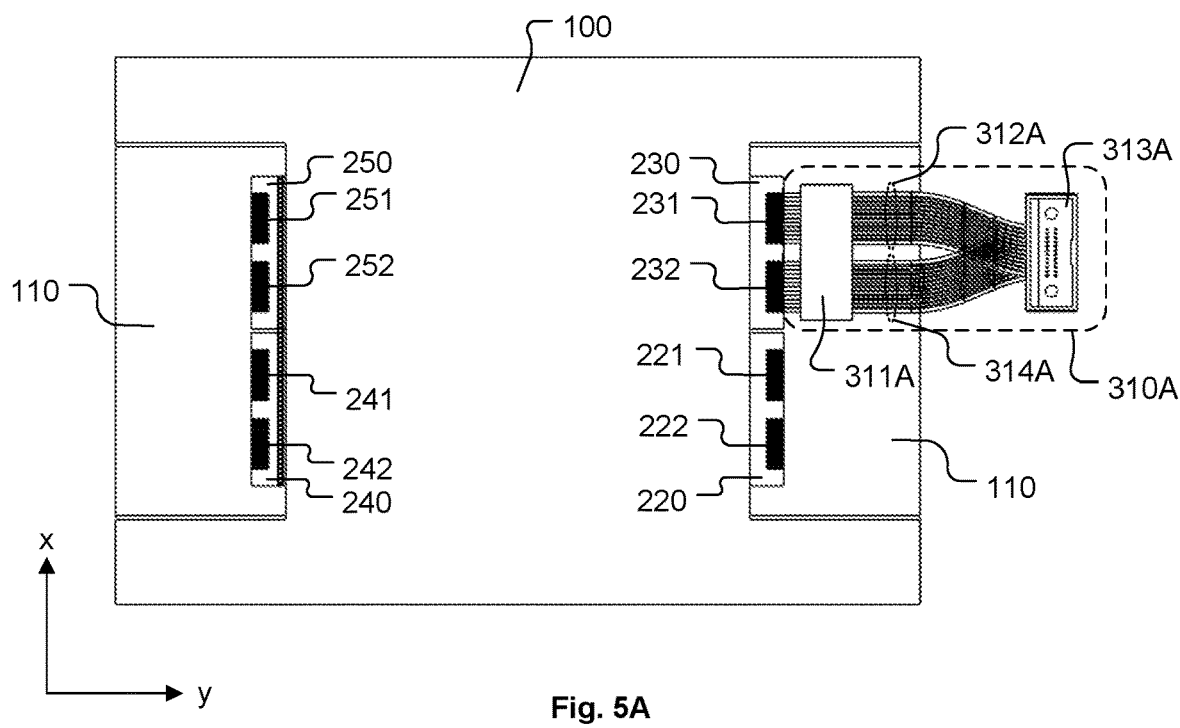
FIG. 5A shows a bottom view of the configuration of FIG. 4A, with an optical fiber assembly connected to the first v-groove array and the second v-groove array of the semiconductor chip, in accordance with some embodiments.
Figure 5B:
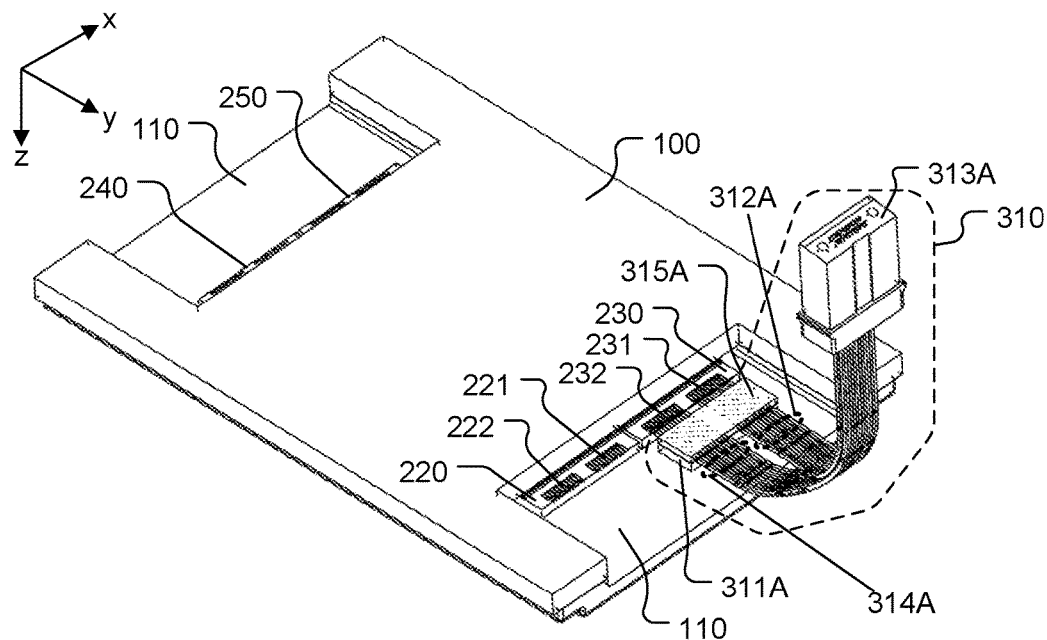
FIG. 5B shows an isometric view of the configuration of FIG. 4A, with the optical fiber assembly connected to the first v-groove array and the second v-groove array of the semiconductor chip, in accordance with some embodiments.

FIG. 5A shows a bottom view of the configuration of FIG. 4A, with an optical fiber assembly 310A connected to the first v-groove array 231 and the second v-groove array 232 of the semiconductor chip 230, in accordance with some embodiments. FIG. 5B shows an isometric view of the configuration of FIG. 4A, with the optical fiber assembly 310A connected to the first v-groove array 231 and the second v-groove array 232 of the semiconductor chip 230, in accordance with some embodiments. In some embodiments, the optical fiber assembly 310A includes a first set of optical fibers 312A that are inserted into the v-grooves of the first v-groove array 231 and a second set of optical fibers 314A that are inserted into the v-grooves of the second v-groove array 232. The optical fiber assembly 310A also includes an optical fiber connector 313A, and a v-groove array 311A. The v-groove array 311A is configured to hold the first set of optical fibers 312A at a prescribed pitch. The v-groove array 311A is also configured to hold the second set of optical fibers 314A at the prescribed pitch. The prescribed pitch is a center-to-center spacing between cores of adjacent optical fibers within the v-groove array 311A, as measured perpendicularly between the core axes of the adjacent optical fibers within the v-groove array 311A. In some embodiments, the prescribed pitch of the first set of optical fibers 312A in the v-groove array 311A and/or the second set of optical fibers 314A in the v-groove array 311A is about 250 micrometers. In some embodiments, the prescribed pitch of the first set of optical fibers 312A in the v-groove array 311A and/or the second set of optical fibers 314A in the v-groove array 311A is about 127 micrometers. In some embodiments, the prescribed pitch of the first set of optical fibers 312A in the v-groove array 311A and/or the second set of optical fibers 314A in the v-groove array 311A is set at a value other than 250 micrometers or 127 micrometers, so long as the prescribed pitch provides for alignment of the first set of optical fibers 312A with the first v-groove array 231 and alignment of the second set of optical fibers 314A with the second v-groove array 232.

The v-groove array 311A of the optical fiber assembly 310A is configured to align the first set of optical fibers 312A with the first v-groove array 231 on the semiconductor chip 230. The v-groove array 311A is also configured to align the second set of optical fibers 314A with the second v-groove array 232 on the semiconductor chip 230. In some embodiments, a cover structure 315A is secured to the v-groove array 311A in order to stabilize the first set of optical fibers 312A and the second set of optical fibers 314A in the v-groove array 311A. In some embodiments, the cover structure 315A is epoxied to the v-groove array 311A. In some embodiments, the cover structure 315A is fusion-bonded to the v-groove array 311A. In some embodiments, the v-groove array 311A and/or the cover structure 315A is formed of glass or silicon. In other embodiments, the v-groove array 311A and/or the cover structure 315A is formed of aluminum, Invar, nickel, plastic, or essentially any other material that provides required mechanical strength and that is chemically and thermally compatible with the particular application.

In some embodiments, the optical fiber connector 313A is an MT (mechanical transfer) ferrule. In some embodiments, the optical fiber connector 313A is an FC (fixed connection) optical fiber connector, or an LC (Lucent connector) optical fiber connector, or an ST (straight tip) optical fiber connector, or another type of optical fiber connector. The optical fibers in the first set of optical fibers 312A and the optical fibers in the second set of optical fibers 314A have lengths as needed to provide for installation of the optical fiber assembly 310A. It should be understood that the curvature and orientation of the first set of optical fibers 312A and the second set of optical fibers 314A in any of the optical fiber assembly 310A embodiments disclosed herein is provided by way of example, and is in no way limiting. In various embodiments, the first set of optical fibers 312A and the second set of optical fibers 314AB in any of the optical fiber assembly 310A embodiments disclosed herein can be configured and oriented as needed to enable installation of the optical fiber assembly 310A.

In some embodiments, the v-groove arrays 231 and 232 are respective parts of a same v-groove array. The optical fiber assembly 310A includes the plurality of optical fibers 312A, 314A that are positioned and secured within the v-groove array 231, 232 of the semiconductor chip 230. The optical fiber assembly 310A includes the v-groove array 311A configured to align the plurality of optical fibers 312A, 314A to the v-groove array 231, 232 of the semiconductor chip 230. An end of each of the plurality of optical fibers 312A, 314A is exposed for optical coupling within the optical fiber connector 313A of the optical fiber assembly 310A. The optical fiber connector 313A is located at a distal end of the optical fiber assembly 310A relative to the semiconductor chip 230.

Figure 6:
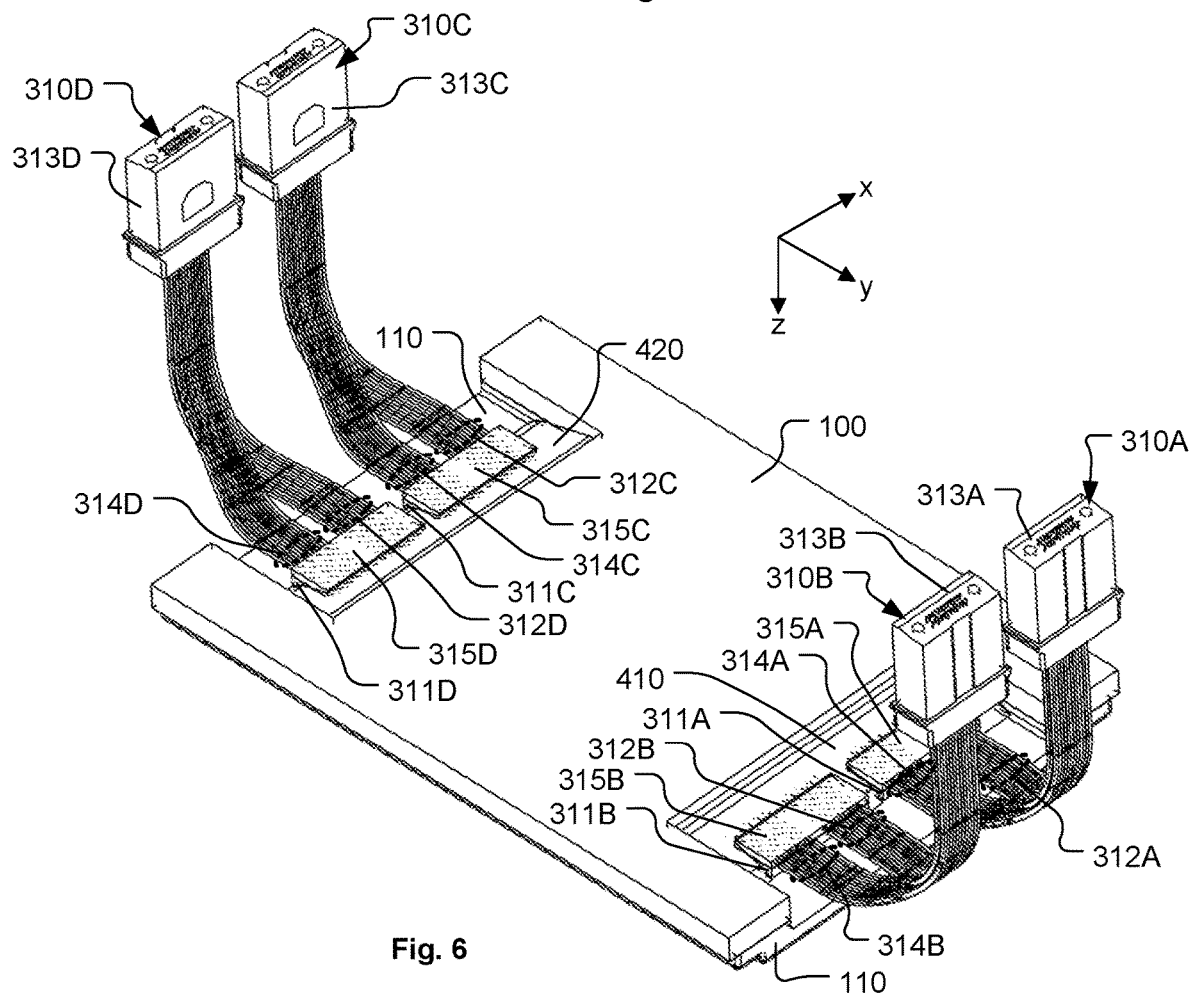
FIG. 6 shows a isometric bottom view of the configuration of FIG. 4A with optical fiber assemblies respectively connected to the semiconductor chips, in accordance with some embodiments.

FIG. 6 shows an isometric bottom view of the configuration of FIG. 4A with optical fiber assemblies 310A, 310B, 310C, 310D respectively connected to the semiconductor chips 220, 230, 240, 250, in accordance with some embodiments. More specifically, in addition to the first optical fiber assembly 310A being connected to the first v-groove array 231 and the second v-groove array 232 of the semiconductor chip 230, a second optical fiber assembly 310B is connected to the first v-groove array 221 and the second v-groove array 222 of the semiconductor chip 220, and a third optical fiber assembly 310C is connected to the first v-groove array 251 and the second v-groove array 252 of the semiconductor chip 250, and a fourth optical fiber assembly 310D is connected to the first v-groove array 241 and the second v-groove array 242 of the semiconductor chip 240.

The second optical fiber assembly 310B is configured in the same manner as the optical fiber assembly 310A. Specifically, the second optical fiber assembly 310B includes an optical fiber connector 313B at a first end of the second optical fiber assembly 310B and a v-groove array 311B at a second end of the second optical fiber assembly 310B. The second optical fiber assembly 310B also includes a first set of optical fibers 312B secured within the v-groove array 311B and aligned for connection to the first v-groove array 221 of the semiconductor chip 220. The second optical fiber assembly 310B also includes a second set of optical fibers 314B secured within the v-groove array 311B and aligned for connection to the second v-groove array 222 of the semiconductor chip 220. The second optical fiber assembly 310B also includes a cover structure 315B secured to the v-groove array 311B.

In some embodiments, the v-groove arrays 221 and 222 are respective parts of a same v-groove array. The optical fiber assembly 310B includes the plurality of optical fibers 312B, 314B that are positioned and secured within the v-groove array 221, 222 of the semiconductor chip 220. The optical fiber assembly 310B includes the v-groove array 311B configured to align the plurality of optical fibers 312B, 314B to the v-groove array 221, 222 of the semiconductor chip 220. An end of each of the plurality of optical fibers 312B, 314B is exposed for optical coupling within the optical fiber connector 313B of the optical fiber assembly 310B. The optical fiber connector 313B is located at a distal end of the optical fiber assembly 310B relative to the semiconductor chip 220.

The third optical fiber assembly 310C is also configured in the same manner as the optical fiber assembly 310A. Specifically, the third optical fiber assembly 310C includes an optical fiber connector 313C at a first end of the third optical fiber assembly 310C and a v-groove array 311C at a second end of the third optical fiber assembly 310C. The third optical fiber assembly 310C also includes a first set of optical fibers 312C secured within the v-groove array 311C and aligned for connection to the first v-groove array 251 of the semiconductor chip 250. The third optical fiber assembly 310C also includes a second set of optical fibers 314C secured within the v-groove array 311C and aligned for connection to the second v-groove array 252 of the semiconductor chip 250. The second optical fiber assembly 310C also includes a cover structure 315C secured to the v-groove array 311C.

In some embodiments, the v-groove arrays 251 and 252 are respective parts of a same v-groove array. The optical fiber assembly 310C includes the plurality of optical fibers 312C, 314C that are positioned and secured within the v-groove array 251, 252 of the semiconductor chip 250. The optical fiber assembly 310C includes the v-groove array 311C configured to align the plurality of optical fibers 312C, 314C to the v-groove array 251, 252 of the semiconductor chip 250. An end of each of the plurality of optical fibers 312C, 314C is exposed for optical coupling within the optical fiber connector 313C of the optical fiber assembly 310C. The optical fiber connector 313C is located at a distal end of the optical fiber assembly 310C relative to the semiconductor chip 250.

The fourth optical fiber assembly 310D is also configured in the same manner as the optical fiber assembly 310A. Specifically, the fourth optical fiber assembly 310D includes an optical fiber connector 313D at a first end of the fourth optical fiber assembly 310D and a v-groove array 311D at a second end of the fourth optical fiber assembly 310D. The fourth optical fiber assembly 310D also includes a first set of optical fibers 312D secured within the v-groove array 311D and aligned for connection to the first v-groove array 241 of the semiconductor chip 240. The fourth optical fiber assembly 310D also includes a second set of optical fibers 314D secured within the v-groove array 311D and aligned for connection to the second v-groove array 242 of the semiconductor chip 240. The fourth optical fiber assembly 310D also includes a cover structure 315D secured to the v-groove array 311D.

In some embodiments, the v-groove arrays 241 and 242 are respective parts of a same v-groove array. The optical fiber assembly 310D includes the plurality of optical fibers 312D, 314D that are positioned and secured within the v-groove array 241, 242 of the semiconductor chip 240. The optical fiber assembly 310D includes the v-groove array 311D configured to align the plurality of optical fibers 312D, 314D to the v-groove array 241, 242 of the semiconductor chip 240. An end of each of the plurality of optical fibers 312D, 314D is exposed for optical coupling within the optical fiber connector 313D of the optical fiber assembly 310D. The optical fiber connector 313D is located at a distal end of the optical fiber assembly 310D relative to the semiconductor chip 240.

In some embodiments, after connection of the first optical fiber assembly 310A to the semiconductor chip 230 and connection of the second optical fiber assembly 310B to the semiconductor chips 220, a dam-and-fill process or a glob-top process is performed in which an adhesive 410, such as an epoxy or other suitable material, is disposed to cover the first set of optical fibers 312A within the v-groove array 231, the second set of optical fibers 314A within the v-groove array 232, the first set of optical fibers 312B within the v-groove array 221, and the second set of optical fibers 314B within the v-groove array 222. Similarly, after connection of the third optical fiber assembly 310C to the semiconductor chip 250 and connection of the fourth optical fiber assembly 310D to the semiconductor chips 240, the dam-and-fill process or the glob-top process is performed in which an adhesive 420, such as an epoxy or other suitable material, is disposed to cover the first set of optical fibers 312C within the v-groove array 251, the second set of optical fibers 314C within the v-groove array 252, the first set of optical fibers 312D within the v-groove array 241, and the second set of optical fibers 314D within the v-groove array 242. In some embodiments, an optical adhesive is used to interface with the optical fibers 312A, 314A, 312B, 314B, 312C, 314C, 312D, 314D, particularly at locations between the ends of the optical fibers 312A, 314A, 312B, 314B, 312C, 314C, 312D, 314D and the corresponding semiconductor chips 230, 220, 250, 240.

In some embodiments, the adhesives 410 and 420 are applied in a manner that avoids creation of voids in the adhesives 410 and 420. In some embodiments, the v-groove arrays 311A and 311B of the optical fiber assemblies 310A and 310B, respectively, act as a dam to assist with application of the adhesive 410. Similarly, in some embodiments, the v-groove arrays 311C and 311D of the optical fiber assemblies 310C and 310D, respectively, act as a dam to assist with application of the adhesive 420. It should be understood that the adhesive 410 serves to protect the exposed optical fibers within the v-groove arrays 231, 232, 221, and 222 and provides for securing of the optical fiber assemblies 310A and 310B to the substrate 100 and to the IHS 110. Similarly, the adhesive 420 serves to protect the exposed optical fibers within the v-groove arrays 251, 252, 241, and 242 and provides for securing the optical fiber assemblies 310C and 310D to the substrate 100 and the IHS 110.

Figure 7A:
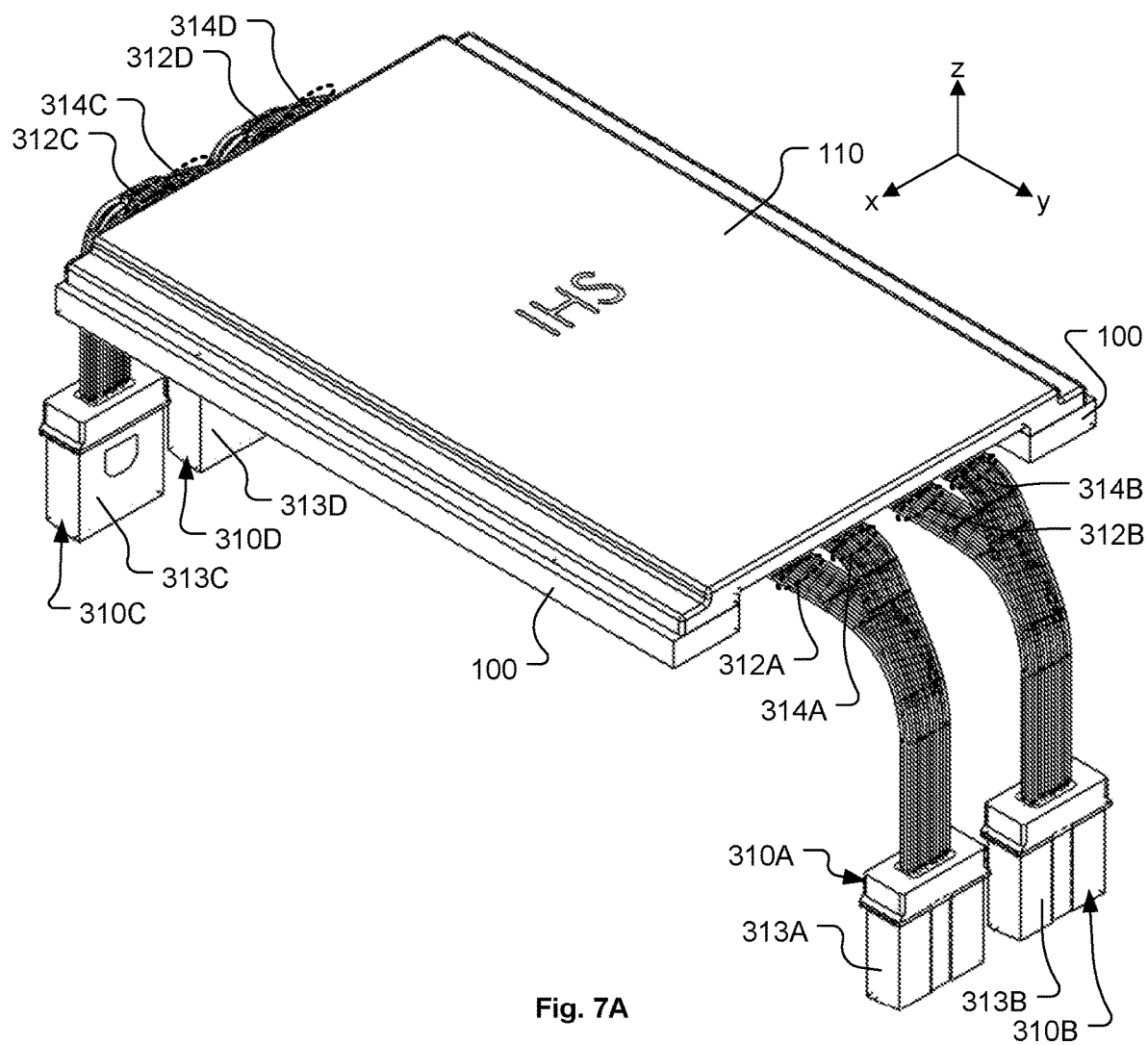
FIG. 7A shows a top isometric view of the configuration of FIG. 6, in accordance with some embodiments.
Figure 7B:
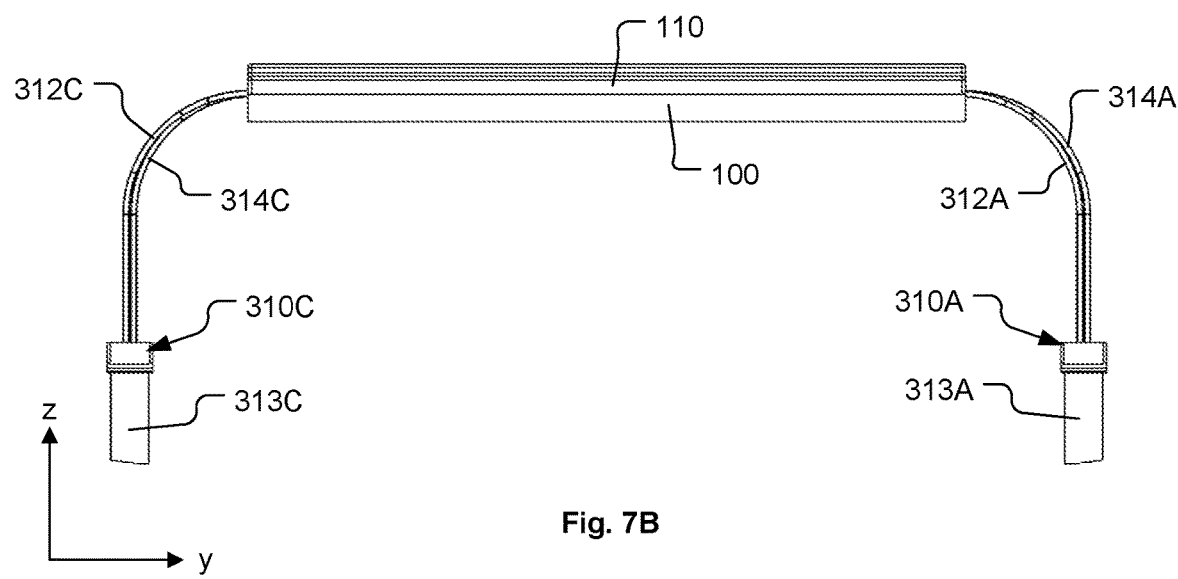
FIG. 7B shows a side view of the configuration of FIG. 6, in accordance with some embodiments.
Figure 7C:
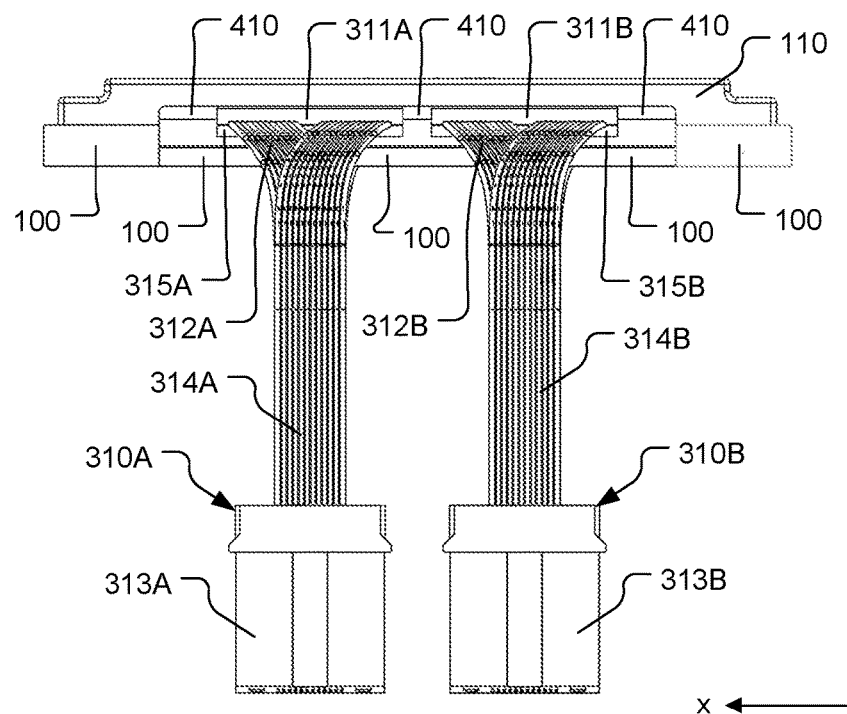
FIG. 7C shows an end view of the configuration of FIG. 6, in accordance with some embodiments.
Figure 7D:
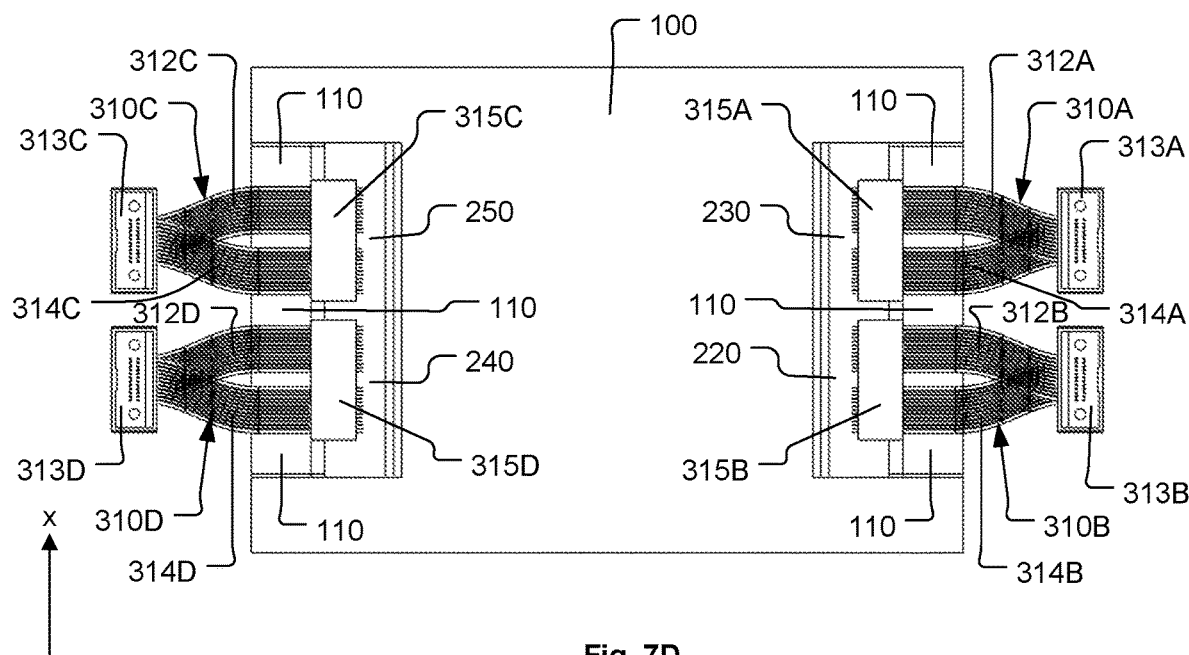
FIG. 7D shows a bottom view of the configuration of FIG. 6, in accordance with some embodiments.
Figure 7E:
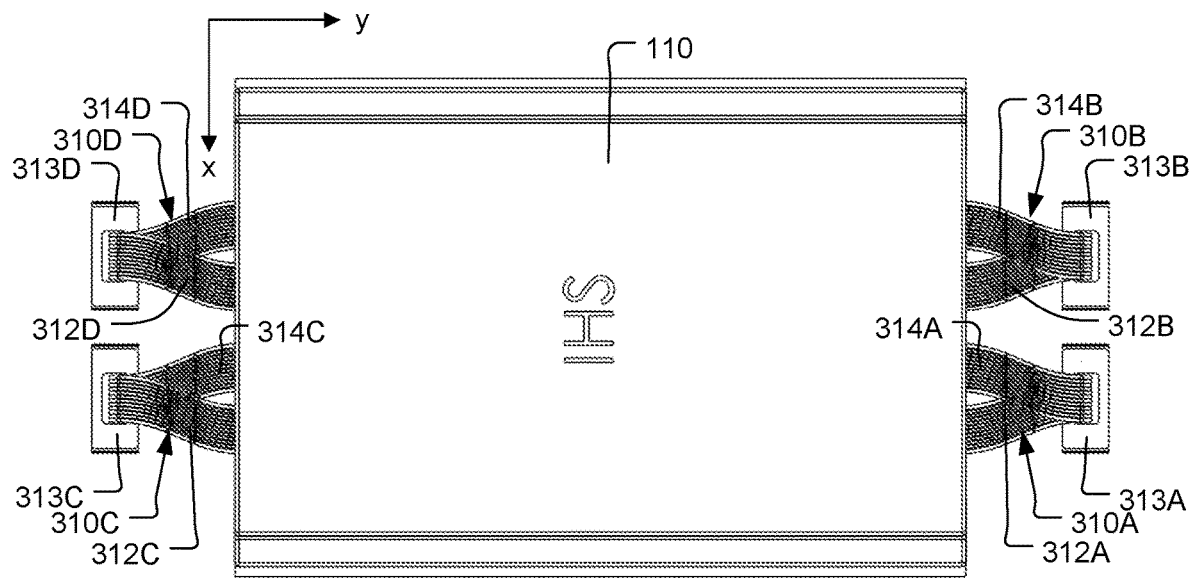
FIG. 7E shows a top view of the configuration of FIG. 6, in accordance with some embodiments.

FIG. 7A shows a top isometric view of the configuration of FIG. 6, in accordance with some embodiments. FIG. 7B shows a side view of the configuration of FIG. 6, in accordance with some embodiments. FIG. 7C shows an end view of the configuration of FIG. 6, in accordance with some embodiments. FIG. 7D shows a bottom view of the configuration of FIG. 6, in accordance with some embodiments. FIG. 7E shows a top view of the configuration of FIG. 6, in accordance with some embodiments.

Figure 8A:
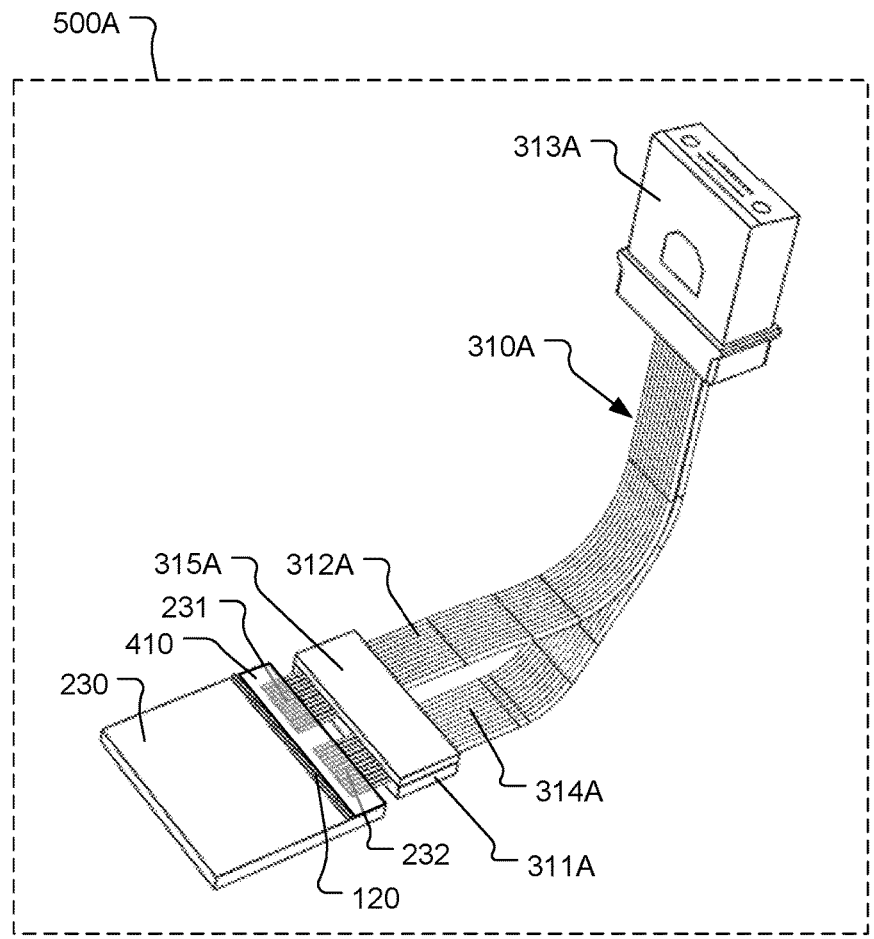
FIG. 8A shows the optical fiber assembly inserted into the v-groove arrays of the semiconductor chip to form a sub-mount assembly prior to the flip-chip process to connect the semiconductor chip to the substrate, in accordance with some embodiments.

FIG. 8A shows the optical fiber assembly 310A inserted into the v-groove arrays 231 and 232 of the semiconductor chip 230 to form a sub-mount assembly 500A prior to the flip-chip process to connect the semiconductor chip 230 to the substrate 100, in accordance with some embodiments. In some embodiments, the cover structure 315A is epoxied to the v-groove array 311A of the optical fiber assembly 310A to stabilize the optical fibers in the first set of optical fibers 312A and the optical fibers in the second set of optical fibers 312B. In some embodiments, after insertion of the first set of optical fibers 312A into the v-groove array 231 and insertion of the second set of optical fibers 314A into the v-groove array 232, the dam-and-fill process or the glob-top process is performed to apply the adhesive 410. It should be understood that in some embodiments each of the semiconductor chips 220, 240, and 250 are separately connected to the optical fiber assemblies 310B, 310D, 310C, respectively, to form sub-mount assemblies 500B, 500D, 500C, respectively, like that of sub-mount assembly 500A before flip-chip connection of the semiconductor chips 220, 240, 250 to the substrate 100.

Figure 8B:
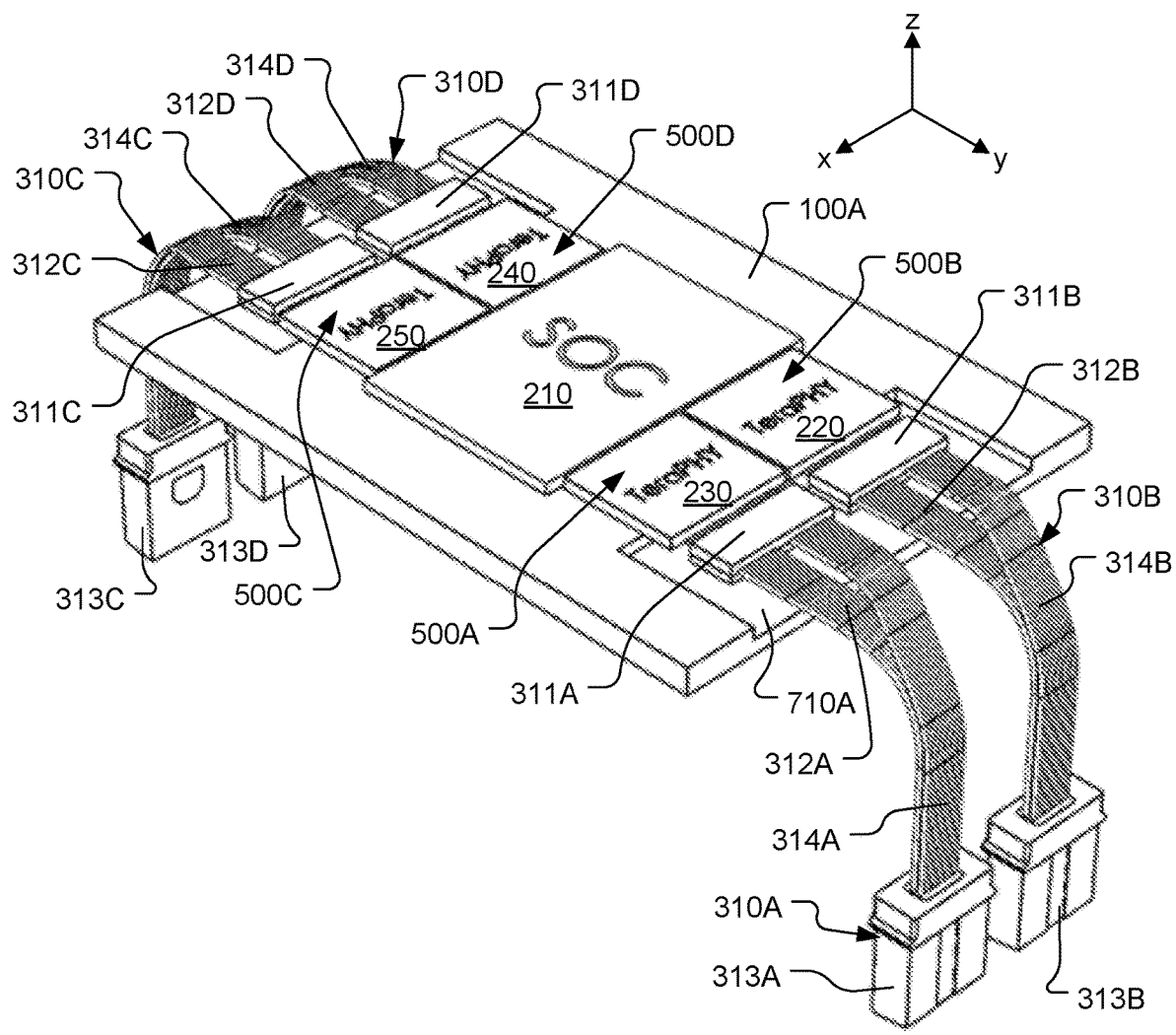
FIG. 8B shows the sub-mount assemblies for each of the semiconductor chips flip-chip connected to a substrate, in accordance with some embodiments.

FIG. 8B shows the sub-mount assemblies 500A, 500B, 500C, 500D for each of the semiconductor chips 230, 220, 250, and 240, respectively, flip-chip connected to a substrate 100A, in accordance with some embodiments. The substrate 100A is similar to the substrate 100, except that the substrate 100A includes a blind cavity 710A to accommodate positioning and connection of the sub-mount assemblies 500A and 500B for the semiconductor chips 230 and 220, respectively, to the substrate 100A. The blind cavity 710A is defined to spatially accommodate the cover structure 315A of the optical fiber assembly 310A and the cover structure 315B of the optical fiber assembly 310B. The substrate 100A also includes a blind cavity 710B to accommodate positioning and connection of the sub-mount assemblies 500C and 500D for the semiconductor chips 250 and 240, respectively, to the substrate 100A. The blind cavity 710B is defined to spatially accommodate the cover structure 315C of the optical fiber assembly 310C and the cover structure 315D of the optical fiber assembly 310D.

Figure 9A:
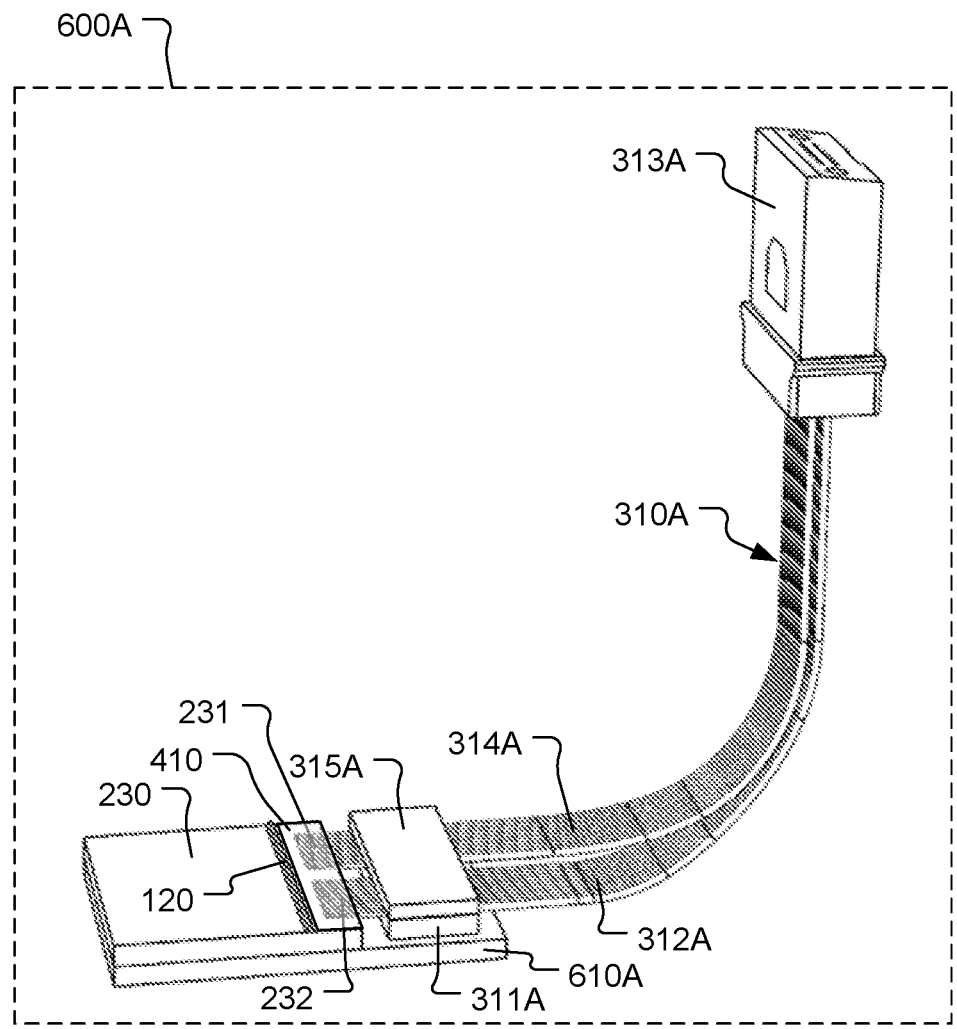
FIG. 9A shows a sub-mount assembly in which the sub-mount assembly of FIG. 8A is attached to a stiffener structure, in accordance with some embodiments.

FIG. 9A shows a sub-mount assembly 600A in which the sub-mount assembly 500A of FIG. 8A is attached to a stiffener structure 610A, in accordance with some embodiments. More specifically, in FIG. 9A, the semiconductor chip 230 is attached to the stiffener structure 610A to form the sub-mount assembly 600A. In various embodiments, the stiffener structure 610A can be formed of various materials, such as metal (e.g., copper, aluminum, stainless steel, or other metal or metallic alloy), silicon, ceramic, composite material, among other materials. It should be understood that in some embodiments each of the semiconductor chips 220, 240, and 250 are separately connected to stiffener structures 610B, 610D, 610C, respectively, to form sub-mount assemblies 600B, 600D, 600C, respectively, like that of sub-mount assembly 600A before flip-chip connection of the semiconductor chips 220, 240, 250 to the substrate 100A.

Figure 9B:
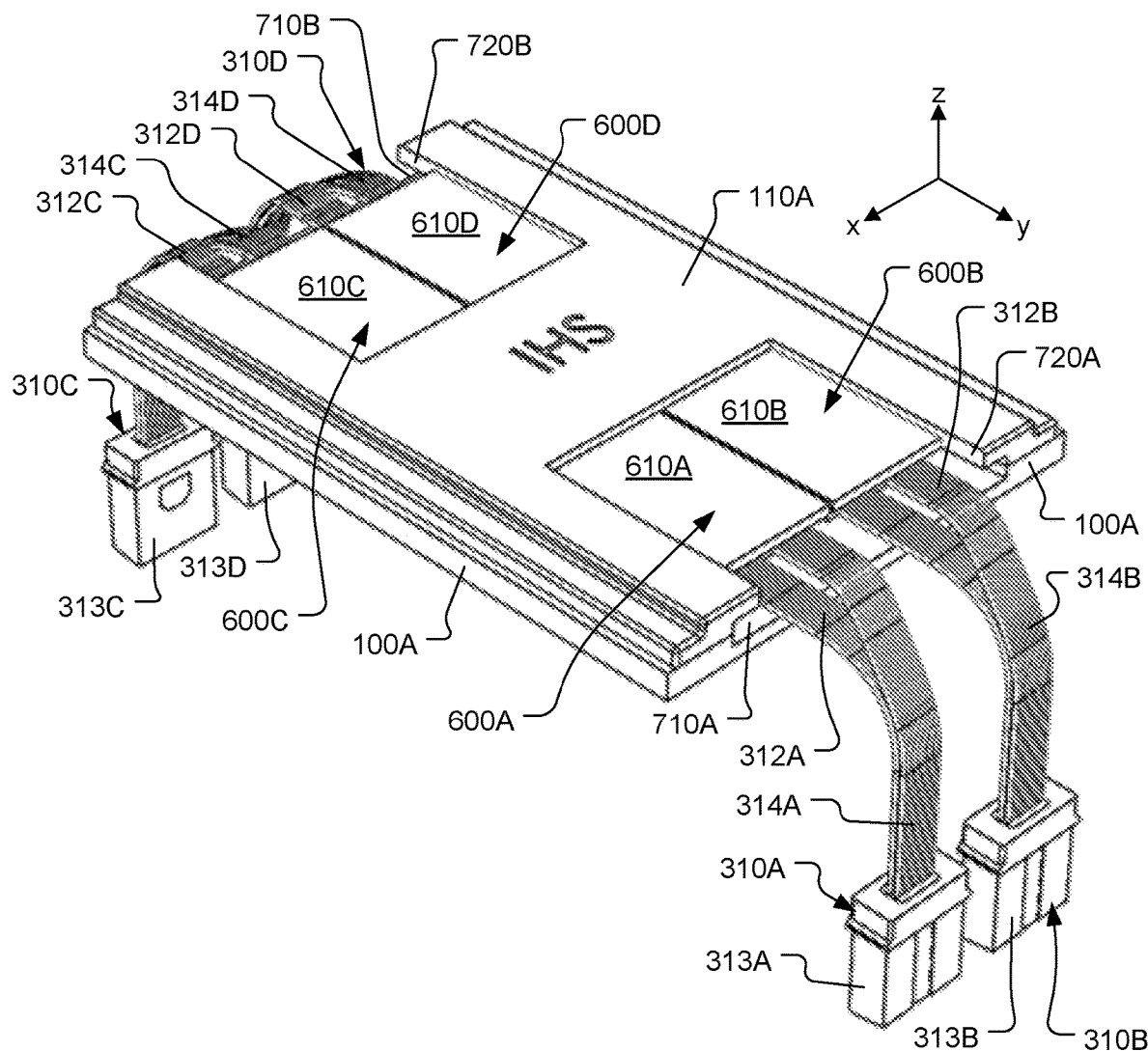
FIG. 9B shows the sub-mount assemblies for each of the semiconductor chips flip-chip connected to the substrate, in accordance with some embodiments of the present invention.

FIG. 9B shows the sub-mount assemblies 600A, 600B, 600C, 600D for each of the semiconductor chips 230, 220, 250, and 240, respectively, flip-chip connected to the substrate 100A, in accordance with some embodiments of the present invention. The assembly of FIG. 9B includes an IHS 110A that is similar to the IHS 110, except that the IHS 110A includes a cut out region 720A to accommodate positioning and connection of the sub-mount assemblies 600A and 600B for the semiconductor chips 230 and 220, respectively, to the substrate 100A. The cut out region 720A is defined to spatially accommodate the stiffener structures 610A and 610B of the sub-mount assemblies 600A and 600B. The IHS 110A also includes a cut out region 720B to accommodate positioning and connection of the sub-mount assemblies 600C and 600D for the semiconductor chips 250 and 240, respectively, to the substrate 100A. The cut out region 720B is defined to spatially accommodate the stiffener structures 610C and 610D of the sub-mount assemblies 600C and 600D.

Figure 10:
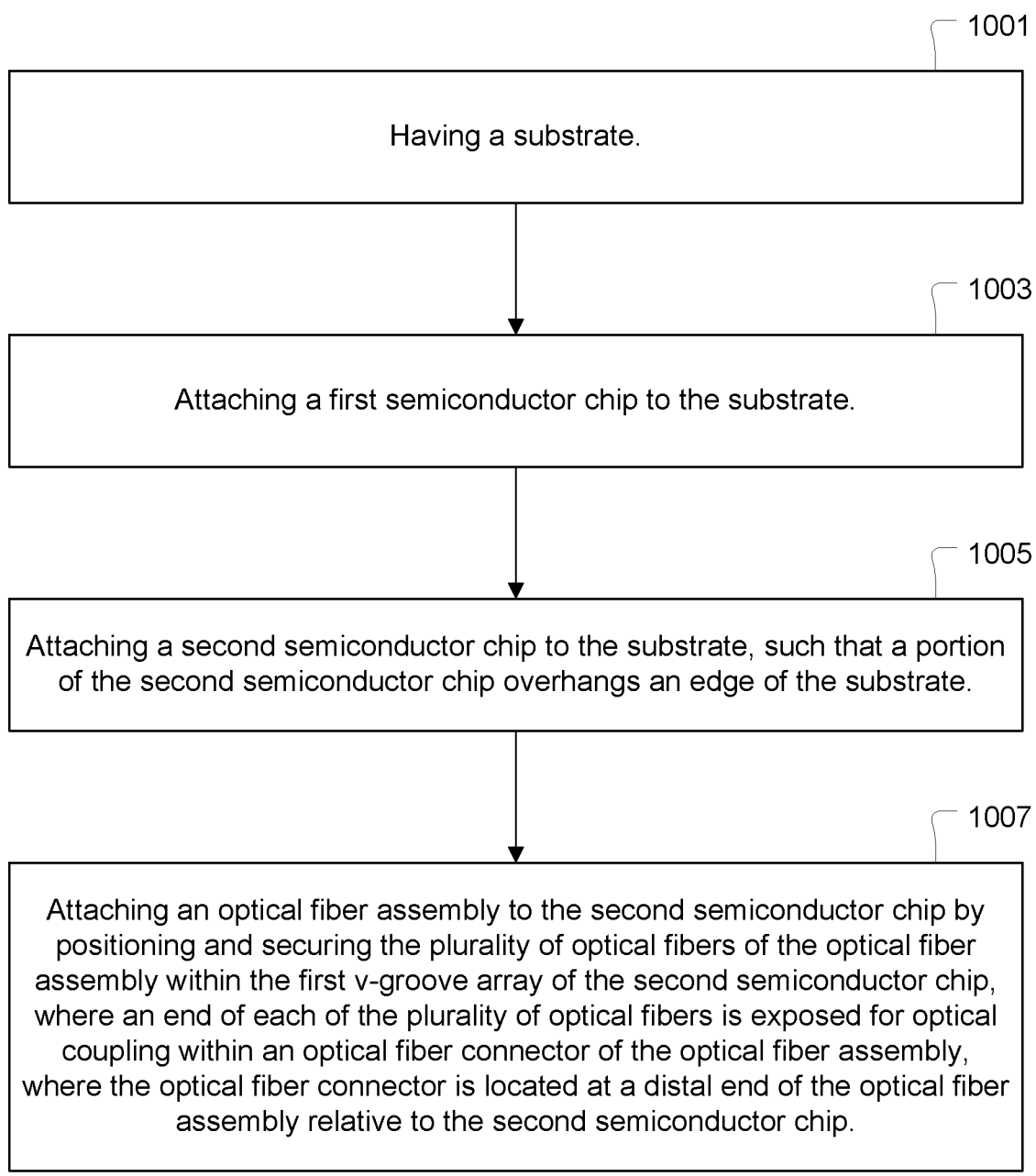
FIG. 10 shows a flowchart of a method for manufacturing a multi-chip package assembly, in accordance with some embodiments.

FIG. 10 shows a flowchart of a method for manufacturing a multi-chip package assembly, in accordance with some embodiments. The method includes an operation 1001 for having a substrate (100). The method includes an operation 1003 for attaching a first semiconductor chip (210) to the substrate. In some embodiments, the first semiconductor chip is a system-on-chip. In some embodiments, the first semiconductor chip is attached to the substrate so that the first semiconductor chip does not overhang any edge of the substrate. In some embodiments, the first semiconductor chip is attached to the substrate by a flip-chip connection. The method includes an operation 1005 for attaching a second semiconductor chip (220, 230, 240, or 250) to the substrate, such that a portion of the second semiconductor chip overhangs an edge of the substrate. In some embodiments, the second semiconductor chip is a photonic device chip. In some embodiments, the second semiconductor chip is attached to the substrate by a flip-chip connection. A first v-groove array (221/222, 231/232, 241/242, 251/252) for receiving a plurality of optical fibers (312A/314A, 312B/314B, 312C/314C, 312D/314D) is present within the portion of the second semiconductor chip that overhangs the edge of the substrate. The method also includes an operation 1007 for attaching an optical fiber assembly (310A, 310B, 310C, 310D) to the second semiconductor chip by positioning and securing the plurality of optical fibers of the optical fiber assembly within the first v-groove array of the second semiconductor chip. An end of each of the plurality of optical fibers is exposed for optical coupling within an optical fiber connector (313A, 313B, 313C, 313D) of the optical fiber assembly. The optical fiber connector is located at a distal end of the optical fiber assembly relative to the second semiconductor chip. In some embodiments, attaching the optical fiber assembly to the second semiconductor chip includes aligning a second v-groove array (311A, 311B, 311C, 311D) of the optical fiber assembly that includes the plurality of optical fibers to the first v-groove array of the second semiconductor chip.

In some embodiments, the method also includes disposing an underfill material between the second semiconductor chip and the substrate, with a dam structure (120) of the second semiconductor chip preventing the underfill material from being disposed over the first v-groove array of the second semiconductor chip. In some embodiments, the method includes disposing an adhesive (410, 420) over the plurality of optical fibers within the first v-groove array of the second semiconductor chip. In some embodiments, the method includes securing a cover structure (315A, 315B, 315C, 315D) to the second v-groove array of the optical fiber assembly, such that the cover structure extends over and secures the plurality of optical fibers within the second v-groove array of the optical fiber assembly. In some embodiments, the cover structure is secured to the second v-groove array of the optical fiber assembly by an epoxy. In some embodiments, the method includes attaching both the second semiconductor chip and the second v-groove array of the optical fiber assembly to a stiffener structure (610A, 610B, 610C, 610D) before attaching the second semiconductor chip to the substrate. The second semiconductor chip is positioned between the stiffener structure and the substrate when the second semiconductor chip is attached to the substrate. In some embodiments, the method includes attaching an integrated heat spreader (110) to the substrate, such that the first semiconductor chip and the second semiconductor chip are located between the integrated heat spreader and the substrate. In some embodiments, the method includes disposing a thermal interface material between the integrated heat spreader and both of the first semiconductor chip and the second semiconductor chip.

In some embodiments, the optical fiber assembly attached in operation 1007 is a first optical fiber assembly, and the plurality of optical fibers of the first optical fiber assembly is a first plurality of optical fibers, and the optical fiber connector of the first optical assembly is a first optical fiber connector. In these embodiments, the method includes attaching a third semiconductor chip (220, 230, 240, or 250) to the substrate such that a portion of the third semiconductor chip overhangs an edge of the substrate. A third v-groove array (221/222, 231/232, 241/242, 251/252) for receiving a second plurality of optical fibers (312A/314A, 312B/314B, 312C/314C, 312D/314D) is present within the portion of the third semiconductor chip that overhangs the edge of the substrate. In these embodiments, the method also includes attaching a second optical fiber assembly (310A, 310B, 310C, 310D) to the third semiconductor chip by positioning and securing the second plurality of optical fibers of the second optical fiber assembly within the third v-groove array of the third semiconductor chip. An end of each of the second plurality of optical fibers is exposed for optical coupling within a second optical fiber connector (313A, 313B, 313C, 313D) of the second optical fiber assembly. The second optical fiber connector is located at a distal end of the second optical fiber assembly relative to the third semiconductor chip. In some embodiments, attaching the third semiconductor chip to the substrate includes positioning the third semiconductor chip adjacent to the second semiconductor chip. In some embodiments, the portion of the second semiconductor chip and the portion of the third semiconductor chip overhang a same edge of the substrate. In some embodiments, the portion of the second semiconductor chip and the portion of the third semiconductor chip overhang different edges of the substrate.

In some embodiments, the method further includes attaching a fourth semiconductor chip (220, 230, 240, or 250) to the substrate such that a portion of the fourth semiconductor chip overhangs an edge of the substrate. A fifth v-groove array (221/222, 231/232, 241/242, 251/252) for receiving a third plurality of optical fibers (312A/314A, 312B/314B, 312C/314C, 312D/314D) is present within the portion of the fourth semiconductor chip that overhangs the edge of the substrate. In these embodiments, the method also includes attaching a third optical fiber assembly (310A, 310B, 310C, 310D) to the fourth semiconductor chip by positioning and securing the third plurality of optical fibers of the third optical fiber assembly within the fifth v-groove array of the fourth semiconductor chip. An end of each of the third plurality of optical fibers is exposed for optical coupling within a third optical fiber connector (313A, 313B, 313C, 313D) of the third optical fiber assembly. The third optical fiber connector is located at a distal end of the third optical fiber assembly relative to the fourth semiconductor chip. In some embodiments, attaching the third semiconductor chip to the substrate includes positioning the third semiconductor chip adjacent to the second semiconductor chip, such that the portion of the second semiconductor chip and the portion of the third semiconductor chip overhang a first edge of the substrate, and such that the portion of the fourth semiconductor chip overhangs a second edge of the substrate that is different from the first edge of the substrate. In some of these embodiments, the first edge of the substrate and the second edge of the substrate are on opposite sides of the substrate.

In some embodiments, the method further includes attaching a fifth semiconductor chip (220, 230, 240, or 250) to the substrate such that a portion of the fifth semiconductor chip overhangs an edge of the substrate. A seventh v-groove array (221/222, 231/232, 241/242, 251/252) for receiving a fourth plurality of optical fibers (312A/314A, 312B/314B, 312C/314C, 312D/314D) is present within the portion of the fifth semiconductor chip that overhangs the edge of the substrate. In these embodiments, the method includes attaching a fourth optical fiber assembly (310A, 310B, 310C, 310D) to the fifth semiconductor chip by positioning and securing the fourth plurality of optical fibers of the fourth optical fiber assembly within the seventh v-groove array of the fifth semiconductor chip. An end of each of the fourth plurality of optical fibers is exposed for optical coupling within a fourth optical fiber connector (313A, 313B, 313C, 313D) of the fourth optical fiber assembly. The fourth optical fiber connector is located at a distal end of the fourth optical fiber assembly relative to the fifth semiconductor chip. In some embodiments, attaching the third semiconductor chip to the substrate includes positioning the third semiconductor chip adjacent to the second semiconductor chip, such that the portion of the second semiconductor chip and the portion of the third semiconductor chip overhang a first edge of the substrate. Also, the method includes attaching the fourth semiconductor chip to the substrate by positioning the fourth semiconductor chip adjacent to the fifth semiconductor chip, such that the portion of the fourth semiconductor chip and the portion of the fifth semiconductor chip overhang a second edge of the substrate that is different from the first edge of the substrate. In some of these embodiments, the first edge of the substrate and the second edge of the substrate are on opposite sides of the substrate.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing disclosure includes some detail for purposes of clarity of understanding, it will be apparent that certain changes and modifications can be practiced within the scope of the appended claims. For example, it should be understood that one or more features from any embodiment disclosed herein may be combined with one or more features of any other embodiment disclosed herein. Accordingly, the present embodiments are to be considered as illustrative and not restrictive, and what is claimed is not to be limited to the details given herein, but may be modified within the scope and equivalents of the described embodiments.

What is claimed is:

1. A package assembly, comprising:
a substrate; and
a semiconductor chip attached to the substrate such that a portion of the semiconductor chip overhangs an edge of the substrate, wherein a v-groove array for receiving a plurality of optical fibers is present within the portion of the semiconductor chip that overhangs the edge of the substrate, wherein the semiconductor chip includes a dam structure formed on the portion of the semiconductor chip that overhangs the edge of the substrate at a location between the v-groove array and the substrate, wherein the dam structure protrudes out from a surface of the semiconductor chip in which the v-groove array is formed, wherein the dam structure extends substantially parallel to the edge of the substrate, wherein the dam structure is spaced apart from the substrate so that a gap exists between the dam structure and the edge of the substrate.

2. The package assembly as recited in claim 1, wherein the gap is configured to provide for air flow from a region between the substrate and the semiconductor chip.

3. The package assembly as recited in claim 1, further comprising:
an underfill material disposed between the substrate and the semiconductor chip, wherein the dam structure is configured to separate the underfill material from the v-groove array.

4. The package assembly as recited in claim 1, wherein said semiconductor chip is a first semiconductor chip and said v-groove array is a first v-groove array, wherein the package assembly includes a second semiconductor chip attached to the substrate at a location next to the first semiconductor chip such that a portion of the second semiconductor chip overhangs the edge of the substrate, wherein the second semiconductor chip includes a second v-groove array within the portion of the second semiconductor chip that overhangs the edge of the substrate.

5. The package assembly as recited in claim 4,
wherein the dam structure is formed to extend across both the first semiconductor chip and the second semiconductor chip, the dam structure positioned on the portion of the first semiconductor chip that overhangs the edge of the substrate at a location between the first v-groove array and the substrate, the dam structure also positioned on the portion of the second semiconductor chip that overhangs the edge of the substrate at a location between the second v-groove array and the substrate.

6. The package assembly as recited in claim 5, wherein the dam structure has a substantially linear shape.

7. The package assembly as recited in claim 1, further comprising:
a stiffener structure attached to a surface of the semiconductor chip opposite from the substrate.

8. A sub-mount assembly, comprising:
a semiconductor chip configured for attachment to a substrate, the semiconductor chip including an overhanging portion that overhangs an edge of the substrate when the semiconductor chip is attached to the substrate, wherein a v-groove array for receiving a plurality of optical fibers is formed within the overhanging portion of the semiconductor chip; and
a dam structure formed on the overhanging portion of the semiconductor chip, the dam structure oriented to extend across the semiconductor chip in a direction that is substantially perpendicular to a v-groove direction within the v-groove array, wherein the dam structure protrudes out from a surface of the semiconductor chip in which the v-groove array is formed.

9. The sub-mount assembly as recited in claim 8, wherein a spacing exists between the v-groove array and the dam structure.

10. The sub-mount assembly as recited in claim 8, wherein the dam structure is positioned on the semiconductor chip so that a gap exists between the dam structure and the edge of the substrate when the semiconductor chip is attached to the substrate.

11. The sub-mount assembly as recited in claim 8, further comprising:
   a stiffener structure attached to a surface of the semiconductor chip opposite from a surface of the semiconductor chip in which the v-groove array is formed.

12. The sub-mount assembly as recited in claim 11, wherein the v-groove array extends to an edge of the overhanging portion of the semiconductor chip, and wherein the stiffener structure is a plate that includes an extension portion that extends outward from the edge of the overhanging portion of the semiconductor chip.

13. The sub-mount assembly as recited in claim 12, further comprising:
   an optical fiber alignment block attached to the extension portion of the stiffener structure, the optical fiber alignment block including another v-groove array that substantially aligns with the v-groove array formed within the overhanging portion of the semiconductor chip.

14. The sub-mount assembly as recited in claim 13, further comprising:
   a plurality of optical fibers respectively disposed within v-grooves of the v-groove array formed within the overhanging portion of the semiconductor chip, the plurality of optical fibers also respectively disposed within v-grooves of the optical fiber alignment block.

15. The sub-mount assembly as recited in claim 14, further comprising: an optical fiber connector, the plurality of optical fibers connected to the optical fiber connector, the optical fiber connector configured to expose each of the plurality of optical fibers for optical coupling.

* * * * *